J. M. Hess,
Flower Casket.
No. 108,592. Patented Oct. 25, 1870.
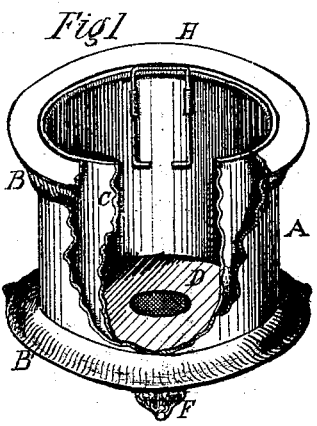
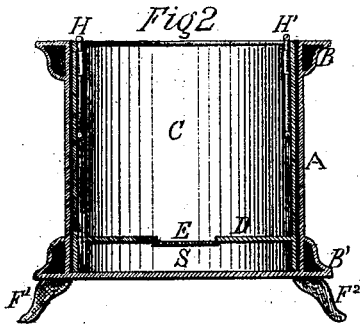
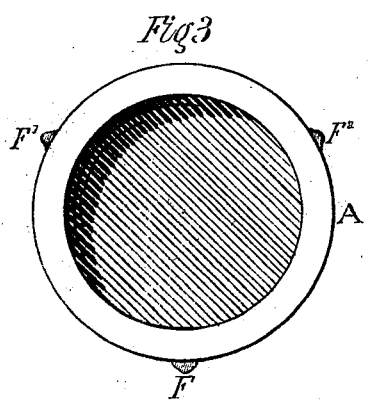
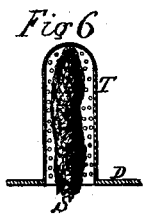
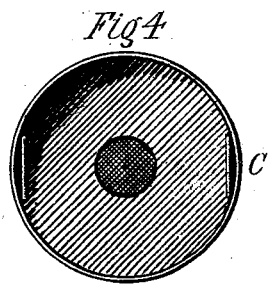
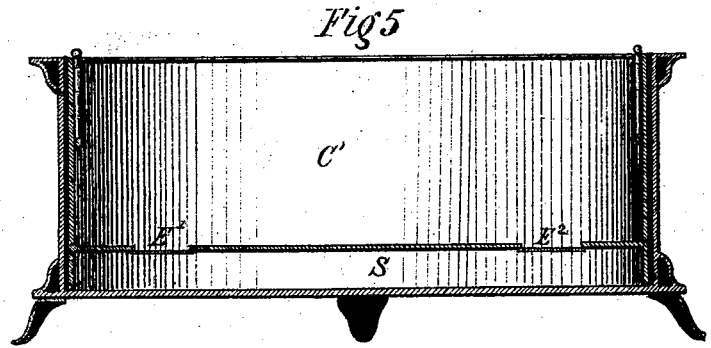

United States Patent Office.

JOHN M. HESS, OF PHILADELPHIA, PENNSYLVANIA.

Letters Patent No. 108,592, dated October 25, 1870.

IMPROVEMENT IN FLOWER-CASKETS.

The Schedule referred to in these Letters Patent and making part of the same.

*To all whom it may concern:*

Be it known that I, JOHN M. HESS, of the city and county of Philadelphia, State of Pennsylvania, have invented a new and improved "Flower-Casket;" and I do hereby declare that the following is a full, clear, and exact description of the construction and operation of the same, reference being had to the accompanying drawing and to the letters of reference marked thereon.

The object of my invention consists in providing a casket of a peculiar construction for holding growing flowers or vines, so that moisture is supplied directly to their roots, and the earth surrounding them, from the bottom of the casket; also in making it of any ornamental design.

Heretofore water has been supplied by pouring it on the surface of the earth and allowing it to pass down and around the roots, which is rather detrimental to the growth of the plants, as very often a larger quantity of water is used than is really necessary, which has a tendency to rot or destroy the roots, and besides causing the earth to pack hard and solid.

Figure 1 is a perspective view, partially broken, of my improved flower-casket.

Figure 2 is a sectional view of same.

Figures 3 and 4 are top views of the casket separated into two parts.

Figure 5 is a sectional view of the casket made in a different form.

To enable those skilled in the art to make and use my invention, I will now proceed to describe its construction and operation.

The casket is made in two parts, with one inserted within the other. One of these parts consists of the outer casing A, made cylindrical in form, and of any suitable metal or material, and provided on the outer surface, and at upper and lower ends, with caps or moldings, B and B', for ornamenting and giving additional strength to it.

The feet F, F¹, and F², which are secured to the bottom of the casing for the purpose of supporting it, are made in any ornamental design.

The inner case or holder C, for containing the earth and roots of the plant, is also made cylindrical in form, and somewhat smaller than the interior of the casing A, into which it is inserted.

The bottom D of the said case or holder is elevated a short distance above its lower end, so as to leave a space, S, between it and the casing A, and is provided in the center with a circular opening, which is covered with a wire gauze or screen, E, so as to allow moisture from the water placed in the casing A to pass through and ascend up and around the roots of the plant; the roots and the earth surrounding them will thus be sufficiently moistened without the water coming in direct contact with them.

The casket may be made in an oblong or elliptical form, as shown in fig. 5, so as to hold flowers of different varieties, and the inner case C' is, for this purpose, provided with two circular openings, and covered with wire gauze, E¹ and E², in the same manner as the case C.

The inner case or holder C or C' is provided, in the interior and at the upper edge, with sliding handles H and H', which are raised when it is desired to remove the case, and lowered so as to be out of the way when it (the case) is inserted in the outer casing A.

Various forms may be adapted for the casings, and they may be ornamented in any style, and, when placed with one of an elliptical form as a center piece, and two of a circular form as the end pieces, they form a beautiful ornament.

The bottom D of the case C or C' may have a series of perforations made through it, instead of the wire gauze, or the central opening may be inclosed with a perforated tube, T, as shown in fig. 6, which extends up the proper height, and has secured in it a sponge, s, the lower end of which is inserted in the water contained in the outer casing A, and the moisture from it will pass through the perforations and through the center portion of the earth.

Having thus described my invention, its construction and operation,

What I claim, and desire to secure by Letters Patent, is—

The inner case or holder C, arranged in the interior of the outer casing A, and provided with sliding handles H and H', wire gauze or screen E, or tube T and sponge s, as and for the purpose specified.

In testimony whereof, I have hereunto signed my name in the presence of two subscribing witnesses.

JOHN M. HESS.

Witnesses:
 ISAAC R. OAKFORD,
 CHARLES H. EVANS.